United States Patent

Terashima

[15] 3,670,759
[45] June 20, 1972

[54] METHOD AND MULTI-BRANCHED NETWORK SYSTEM FOR UNIFORMLY DISTRIBUTING THE FLOW OF MIXED PHASE FLUIDS

[72] Inventor: Toru Terashima, Kawasaki, Japan

[73] Assignee: Nippon Petroleum Refining Company, Tokyo, Japan

[22] Filed: Aug. 3, 1970

[21] Appl. No.: 67,672

[52] U.S. Cl.............................137/171, 137/593, 137/599
[51] Int. Cl.........................................................F16k 45/00
[58] Field of Search..................137/210, 207, 593, 171, 174, 137/599, 599.1

[56] References Cited

UNITED STATES PATENTS

| 3,143,129 | 8/1964 | Anderson | 132/210 |
| 2,685,940 | 8/1954 | Rossi | 137/171 |
| 3,357,606 | 12/1967 | Kahlenberg | 137/593 X |

Primary Examiner—Alan Cohan
Attorney—Clario Ceccon

[57] ABSTRACT

A multi-branched conduit system, supplied with a mixed-phase fluid, may have its distribution network controlled with respect to the uniformity of the liquid and gaseous fluids therein by employing an upper gas conduit and, optionally, a lower liquid conduit, so that the mixed-phase fluid introduced in the main header positioned between said upper and lower conduits deliver a uniformly mixed flow to each of the branches of the system, even when the ratio of liquid to gas or vapor is in the main header.

5 Claims, 3 Drawing Figures

METHOD AND MULTI-BRANCHED NETWORK SYSTEM FOR UNIFORMLY DISTRIBUTING THE FLOW OF MIXED PHASE FLUIDS

INTRODUCTION

The present invention relates to a method for uniformly distributing the flow of mixed-phase fluids, such as vapor-liquid mixtures, and to networks in particular, which comprise a vapor gas conduit connected to multi-branched conduit systems.

THE PRIOR ART

Not only in the petrochemical industry, where the present invention is most useful, but also in other chemical industries, mixed-phase fluids are quite commonly employed. However, while it is easy to distribute single phase fluids uniformly, it is very difficult to do the same with vapor-liquid mixed-phases. The problems involve not only the uniformity of distribution of a vapor-liquid mixed-phase, but also the control of the pressure loss caused by the disproportion of the phases in distribution, the abatement of corrosion, abrasion and calking attributable to phase disproportion in the distribution of the fluid.

In other words, when a mixed-phase fluid is passed through such equipment as a heating furnace, a cooler, a heat-exchanger or the like, the flow of vapor-liquid mixed phase is usually divided into a predetermined number of streams to increase the efficiency of the operation and the divided streams are passed through such equipment.

However, when the mixed-phase fluid is distributed disproportionally, the composition of the individual mixed-phase fluid streams cannot be predicted and therefore it becomes quite difficult, if not impossible, to adjust the phase properly.

For example, in the case of a heating furnace, the problem of calking is aggravated by the residence of liquid in the furnace or, if the flow rate is increased above the required level where the residence of the liquid or vapor phases is maldistributed, corrosion or abrasion of the equipment readily results. These harmful results are even more apparent when the vapor and/or the liquid phases of the fluid are inherently corrosive.

The problem of a uniform flow distribution of the mixed-phase fluid is, therefore, paramount in increasing the efficiency of the equipment and the life thereof, while at the same time simplifying the operation of the device and reducing the cost of operation.

In a conventional device requiring uniform distribution of a mixed-phase fluid, a predetermined number of branched conduits are provided perpendicularly to the inlet main header to distribute the flow of the mixed phase fluid. However, when such a conventional network is employed, the distribution usually becomes disproportionate in its phases and the pressure loss attributable thereto is considerable, so that sometimes, even corrosion or abrasion can result and the life of the equipment is substantially lowered.

A known improvement to the above described conventional network is the symmetrical distribution of the mixed-phase fluid. However, when this method is used, the flow of the mixed-phase fluid is distributed by means of a symmetrically branched conduit with respect to the central axis of the flow, so that this operation must be repeated over and over until a relatively uniform distribution can be obtained.

As a result, when the number of conduit branches is large, or when the mixed-phase fluid is distributed into an odd number of branches, or when the flow rate or the ratio of vapor to liquid is changed, the distribution network becomes complicated, and quite uneconomical. Finally, when a uniform distribution of the mixed phase fluid is difficult to obtain, a control valve is often provided on a vapor-liquid separator to separate the vapor from the liquid, and the respective phases may be treated as single phase flows; however, in so doing, the overall operation becomes much more difficult, and various kinds of equipment are required, thus increasing costs and hindering practicality.

BRIEF SUMMARY OF THE INVENTION

The present invention overcomes the above indicated disadvantages of the conventional systems for distributing the flow of mixed-phase fluids by providing a method and a network for the substantially perfectly uniform distribution in multi-branched conduits of mixed-phase fluids, regardless of any changes in the rate of flow and in the ratio of vapor to liquid in the fluid.

Briefly stated, the system according to a first embodiment of the present invention is characterized in that the flow of the mixed-phase fluid introduced through an inlet main header is distributed into a multi-branched conduit, so that the force generated by the disproportion of distribution of the phases in the fluid, i.e., the static pressure in the branched conduit rising from the main header and the difference in flow rate of liquid and gas are utilized to correct the non-uniformity of distribution of vapor and liquid, and achieve a uniform re-distribution thereof.

The tendency for the mixed-phase fluid introduced into the inlet main header to be distributed into said multi-branched conduit in such a manner that the ratio of vapor to liquid and the rate of flow are non-uniform so that in some of the branches of the branched conduit the liquid phase is predominant, while, on the other hand, the vapor phase predominates in some other branches, is self-evident without the system of the present invention.

In accordance with the present invention, uniform distribution of the flow of the mixed-phase fluid is achieved by the use of an upper vapor line or gas line and of vertical connecting conduits between the vapor line and the main header. At the bottom of the branched system, where the liquid phase predominates, under the inlet fluid pressure and the characteristics of flowing vapor phases a part of the liquid is urged to the inlet header and to the liquid conduit, while a liquid head of higher velocity is generated by the flow of vapor at the bottom of the branched system where the vapor phase is predominant and the fluid can be uniformly distributed by sucking liquid from the liquid conduit or inlet main header.

With regard to the effects obtained by this branched system, at the lowermost portion of the vertical connectors of the branched conduit the greater static pressure head provides the upper vapor conduit at the top of the vertical connectors with vapor and a part of the distributed liquid is pushed out to the liquid phase conduit or alternatively, to the inlet main header when said liquid conduit is not used.

This physical phenomenon can be further accelerated as more of the liquid stagnates at the inlet main header in the neighborhood of the juncture with the vertical connectors. More of the liquid can be distributed because both vapor and liquid can be more easily separated as the ratio of liquid in the vapor-liquid mixed-phase increases.

On the other hand, a liquid pressure head of higher velocity is generated at the bottom of the vertical connectors of the branched conduit where the vapor is predominant and the liquid is sucked from the liquid conduit or, alternatively, from the inlet main header, when said liquid conduit is not used.

In addition, when apparatus having substantially equal resistance are connected to one end of the multi-branched conduit and the outlets from these apparatus are connected to the main outlet duct of the system of this invention, a part of the vapor of the mixed-phase fluid is flowed into the vapor conduit from the upper regions of the branched conduit, where the vapor predominates, so that, as a result, at the point where the vapor conduit and the liquid conduit meet, there is a flow in opposite directions or, when liquid conduit is not used, the liquid in the inlet main header flows hardly at all in the direction of the flow existing within the vapor conduit, while it easily flows in the opposite direction. Therefore, the vapor and the liquid are uniformly distributed when they enter the operation equipment. The corrective effect on the distribution becomes greater as the distribution into the branched conduit is less uniform, so that if the composition of the flow of vapor-liquid mixed phase in the inlet header is changed as a function of position and time, it is possible to distribute uniformly the flow of the vapor-liquid mixed-phase into any number of streams.

According to a second embodiment of the invention, the flow of a vapor-liquid mixed-phase fluid may be distributed uniformly with or without using a liquid conduit. Yet, when the liquid conduit is used and a multi-branched conduit is employed, the branched conduit is provided with connectors directed downwards from the inlet main header, and then turned upwardly, instead of being provided with simple vertical connectors as described hereabove.

THE ACCOMPANYING DRAWINGS

DETAILED DESCRIPTION OF THE INVENTION

Figure 1:
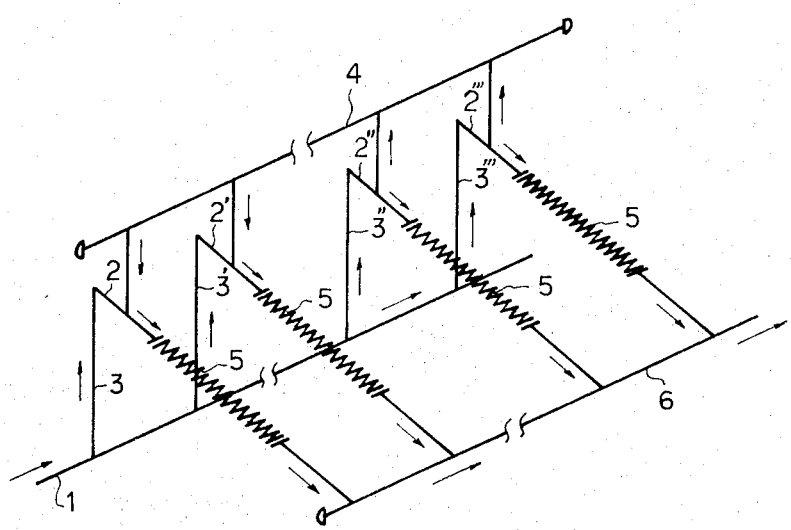
FIG. 1 is a perspective diagram showing the system of the invention according to a first embodiment thereof.

FIG. 1 is a diagram showing in perspective the system of a first embodiment for uniformly distributing a mixed-phase fluid when the liquid conduit is not employed and the vapor-liquid mixed-phase fluid flows from the inlet main header directly into the network.

A plurality of branch pipes 2, 2', 2'', 2''' are provided on the inlet header 1 and the vapor-liquid mixed-phase fluid is distributed into the vertical connectors 3, 3', 3'', 3'''.

If an excess of liquid is distributed for example into branch pipe 2 a greater static pressure works on the bottom portion of the vertical connector 3 of the branch pipe 2, because there is provided on the uppermost portion of the branch pipe 2 a vapor line 4, so that a part of the distributed liquid is urged down towards the inlet header 1 and out.

On the other hand, when an excess of vapor is distributed for example into branch pipe 2'', a liquid pressure head of higher velocity is generated at the bottom portion of the branch pipe 2'', and liquid is sucked up from the inlet header 1 into the vertical connector 3''.

The apparatus, such as a heater, a cooler, a heat exchanger, a reactor or the like 5, of equal internal resistance are connected to branch pipes 2, 2', 2'', 2''', and their respective outlets are connected to the main outlet 6. A part of the vapor or the flow of the vapor-liquid mixed-phase is therefore flowed from the top portion of branch pipe 2'' to the vapor line 4.

As a result, the ratio of vapor to liquid and the rate of flow of the mixed-phase fluid may be uniformly adjusted, the mixed-phase fluid entering said devices 5 and thence into the main outlet 6, which outlet 6 is a conduit for merging the branched flows which have been subjected to the various kinds of treatments provided by the devices 5.

Figure 2:
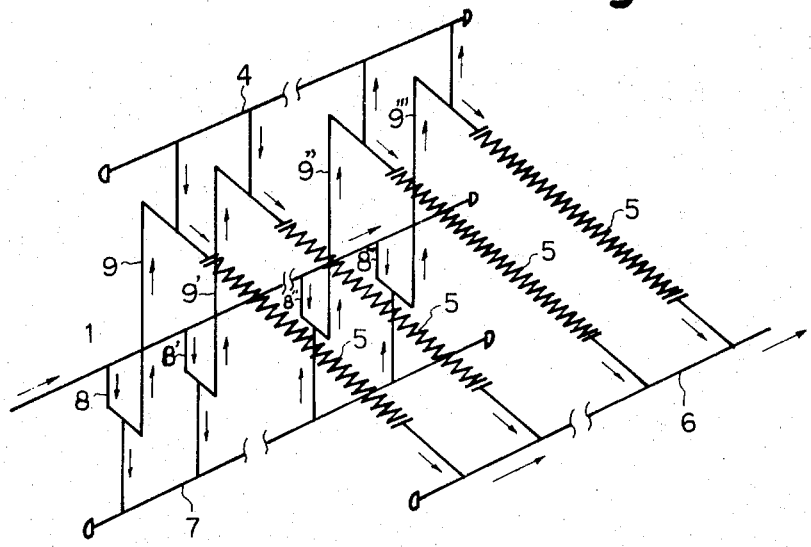
FIG. 2 is a perspective diagram showing the system of the invention according to a second embodiment thereof.

FIG. 2 shows a second embodiment of the present invention, wherein a liquid conduit 7 is provided in addition to the main inlet 1 and the mixed-phase fluid flows into the inlet header 1, and hence to the branch pipes 8, 8', 8'' and 8''' which are connected downwardly from said inlet header 1.

A vapor line 4 is again provided as in the first embodiment on the portion of the vertical connectors 9, 9', 9'', 9''' so that a larger static pressure works on the bottom of the connector 9 of branch pipe 8 where more liquid is distributed than in the rest of the branch pipes, and the liquid is urged down into liquid conduit 7 and out.

On the other hand, a larger velocity pressure head is generated at the bottom of branch pipe 8'' where more vapor is present and the liquid is sucked up from the liquid conduit 7.

As before, the devices 5 of equal resistance are connected to the respective branch pipes 8 . . . 8''', and their outlets are connected to the main outlet 6. Therefore, vapor or a part of the flow of the vapor-liquid mixed-phase is forced into the vapor line 4 from the top of the branch pipe 8''.

The flow at the juncture point where the vapor line 4 and the liquid conduit 7 face each other, is in the opposite direction, so that the ratio of liquid to vapor and the rate of flow thereof may be uniformly corrected and distributed before the fluid enters the devices 5.

With the present invention, it is not always necessary to merge any branched flows from the devices 5, although the embodiments of the distribution network described hereabove so illustrate.

Substantially more uniform distribution may be obtained when the resistances of the inlet main header 1, main outlet 6, vapor line 4, liquid conduit 7 and branched pipes are lower than the resistances of the various devices employed, and when the height of vertical connectors of more than two branch pipes is greater than the flow resistance of the liquid conduit 7 or of the inlet main header 1.

In a practical sense, the resistances of the apparatus employed are larger than the resistances of the distributing pipes, in most cases, and therefore the diameter of the inlet main header and of the main outlet, as well as the diameter of the branched pipes and the height of the vertical connectors may be respectively determined, and the vapor line and liquid conduit may be of smaller diameter than the diameter of the branch pipes.

ILLUSTRATIVE EXAMPLES

Figure 3:
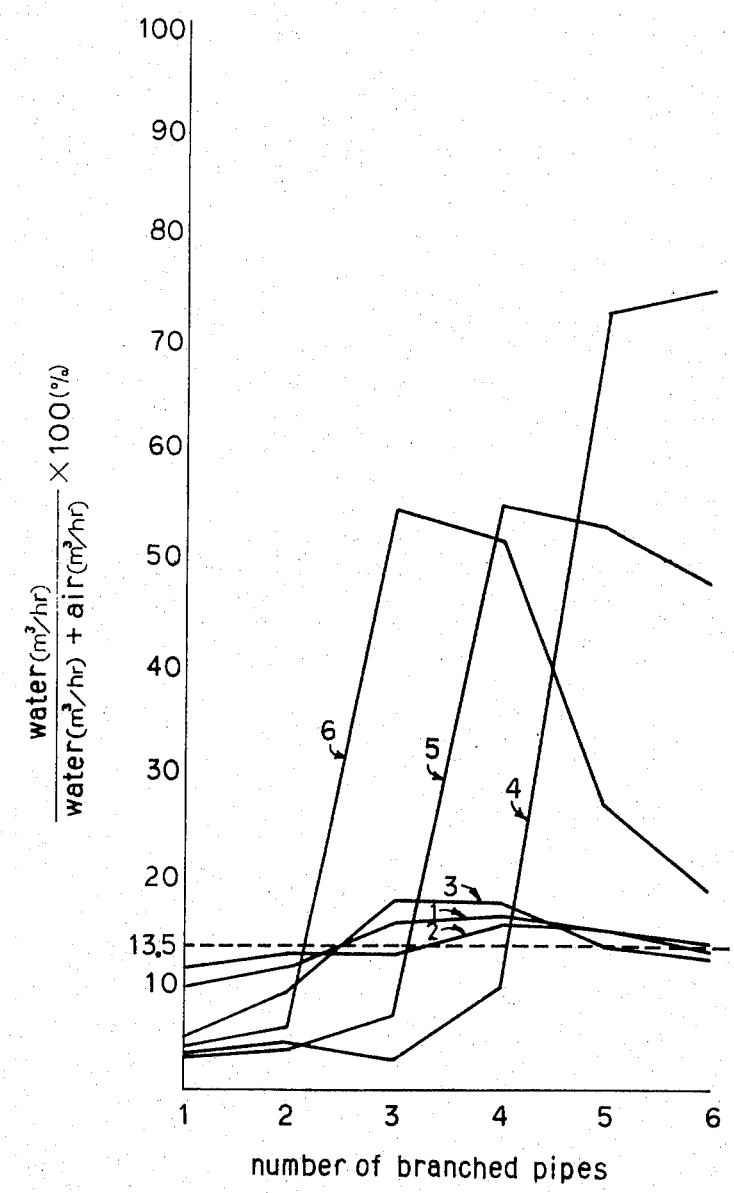
FIG. 3 is a diagram showing the ratio of water in a flow of a water-air mixed-phase fluid resulting from comparative tests made in accordance with the system of the present invention and with another conventional method.

The following is a detail explanation of the diagram shown in FIG. 3, wherein the system of the present invention, in both its embodiments, has been graphically compared with a known conventional system.

EXAMPLE I

The flow of vapor-liquid mixed-phase of water and air was distributed through six branch pipes by using the system shown in FIG. 2.

The conditions under which all experiments were carried out are shown in Table 1 below.

The attached devices were miniature heaters.

The distributed vapor-liquid flow was sampled at the outlet of the respective heaters and the amounts of water and air distributed to the respective branch pipes were measured.

The results obtained are indicated by solid line 1 in the diagram of FIG. 3, which indicates that percent of water in the vapor-liquid mixed-phase flow.

The number of the branch pipes given in the abscissa of FIG. 3 shows the branch pipes in communication with the inlet header in succession from upstream to downstream.

TABLE 1

CONDITIONS FOR EXPERIMENT

| | |
|---|---|
| Amount of water 1.4 m³/hr in fluid | Diameter of branch pipe 15 mm |
| Amount of air 9.0 m³/hr in fluid | Distance between branch pipes 150 mm |
| Inlet pressure 280 mmHg | Height of vertical connectors 150 mm |
| Diameter of inlet main header | Diameter of vapor line and liquid conduit 7.5 mm |

As it can be readily seen from curve 1, the flow of water and air in each branch pipe was almost uniform.

EXAMPLE II

In this second experiment, the inlet pressure was adjusted to 450 mmHg, and the size of the heaters was slightly increased, thus increasing slightly the resistance of the heaters. Except for these minor changes, the same conditions as in Example I experiment were used. The water-air mixed-phase flow was distributed by means of six pipes by using the system as is shown in FIG. 2.

The results of this experiment are indicated in the diagram of FIG. 3 with solid line 2, indicative that the rate of flow of water and air in each branch pipe was almost uniform.

EXAMPLE III

A water-air mixed-phase flow was distributed by means of six branch pipes by using the system of the invention shown in FIG. 1 under the same conditions given in Example I.

As to the apparatus employed, the same heaters as in Example I were used.

The results obtained in the experiment are indicated by the solid line 3 of the diagram in FIG. 3.

EXAMPLE IV (Comparative)

Six branch pipes which were raised perpendicularly upwards from the inlet main header, then bent in the horizontal direction and connected to the devices heaters of Example I, were employed without any vapor line 4. A water-air mixed-phase flow was distributed under the same conditions as in Example I.

The results obtained are indicated by the solid line 4 of the diagram in FIG. 3.

It can be seen that the flow rate of each branch pipe was quite non-uniform and the percent amount of water in branch pipes 5 and 6 was especially excessive.

EXAMPLE V (Comparative)

Six branch pipes which were turned perpendicularly downwards from the inlet main header and then bent in the horizontal direction, where used. No vapor line 4 was employed. A water-air mixed-phase flow was distributed under the same conditions as in Example I. The same heaters were used.

The results obtained in the experiment are indicated by the solid line 5 in the diagram of FIG. 3.

It can be seen that the flow rate in each branch pipe was very non-uniform, and the percent amount of water in branch pipes 1, 2, and 3 was abnormally low while that in the branch pipes 4, 5, and 6 was excessive.

EXAMPLE VI (Comparative)

Six branch pipes which were bent perpendicularly below from the inlet header, then bent in the horizontal direction, raised perpendicularly upwards, bent again the horizontal direction, and connected to the heaters, were used without vapor line 4. The flow of the water-air mixed-phase flow was distributed in the same manner as in Example I.

The heaters used were the same heaters as in Example I.

The results obtained in the experiment are indicated by the solid line 6 in the diagram of FIG. 3.

It can be seen that the flow rate in each branch pipe was very non-uniform and the percent amount of water in branch pipes 3, 4 was especially excessive.

The ratio of the water in each branch pipe would be 1.35 percent, see dotted line in FIG. 3 as is apparent from Table 1, if the flow of the water-air mixed-phase were perfectly and uniformly distributed in all six branch pipes.

From the examples, it can be seen that when the system of the present invention is used, it is possible to distribute substantially uniformly the flow of a vapor-liquid mixed-phase fluid.

Furthermore, with the system of the present invention it was possible to maintain constant the resistances of the attached heaters and at the same time increase the inlet pressure thus increasing the effects as demonstrated by Examples I and II.

On the other hand, when the systems shown in Examples IV, V and VI are employed, the distribution becomes very non-uniform, so that when a different mixed-phase fluid is used, it is quite possible that corrosion or abrasion or other harmful phenomena will result.

What is claimed is:

1. A network system for the substantially uniform distribution of a mixed-phase fluid to one or more process apparatus, said system comprising an elongated main inlet header, a plurality of vertically positioned, axially spaced connectors, said connectors being sufficiently long to cause appreciable static head differential, each of said connectors being in fluid communication at one end thereof with said main inlet header, a branch conduit fluidly connected to each of said vertical connectors and extending outwardly therefrom, the other end of each of said branch conduits being in fluid communication with the process apparatus, and a vapor line positioned above said main inlet header and said branch conduit, said vapor line being in fluid communication with said vertical connectors and said branch conduits.

2. The system of claim 1, wherein said process apparatus are a plurality and have a common main inlet for the discharge of said fluid therefrom.

3. The system of claim 1, which further includes a liquid conduit line located elevationally below said main inlet header and wherein each of said vertical connectors comprises a portion leading downwardly from said main inlet header and in fluid communication with said liquid conduit line.

4. The system of claim 3, wherein said process apparatus are a plurality and have a common main outlet for the discharge of said fluid therefrom.

5. The system of claim 1, wherein said main inlet header also serves as a discharge outlet for excess liquid in the mixed-phase fluid.

* * * * *